United Sta

Macovski

[15] 3,641,264
[45] Feb. 8, 1972

[54] HOLOGRAM REPRODUCTION SYSTEM USING AN OPTICAL GRATING

[72] Inventor: Albert Macovski, Palo Alto, Calif.
[73] Assignee: American Express Investment Management Company, San Francisco, Calif.
[22] Filed: Dec. 31, 1969
[21] Appl. No.: 889,392

[52] U.S. Cl. ..................................178/6.5, 178/6.8, 313/77, 350/3.5
[51] Int. Cl. .........................................H04n 9/54, H04n 9/60
[58] Field of Search.................178/6.5, 6.8, DIG. 3; 350/3.5; 313/77

[56] References Cited

UNITED STATES PATENTS 3,529,083  9/1970  Nelson et al. ............................178/6.8
3,444,316  5/1969  Gerritsen .............................178/6.8 X Primary Examiner—Robert L. Griffin
Assistant Examiner—Richard K. Eckert, Jr.
Attorney—Townsend and Townsend

[57] ABSTRACT

A holographic image reconstruction system in which holographic light amplitude and phase information are resolved separately for reconstruction of the original hologram. The amplitude component is separately detected and reproduced on a cathode-ray tube or other electronically addressable optical display. The image of the amplitude component is projected through an external optical grating onto a film for recording or onto a real time imaging system. Phase information from the holographic data is separately detected and superimposed on the amplitude data by varying the phase of the shadow image of the optical grating on the amplitude image. Phase modulation of the image of the grating is accomplished by modulating the aperture or angle of the lens which images the amplitude pattern through the grating onto the film, or by modulating the grating itself.

21 Claims, 9 Drawing Figures

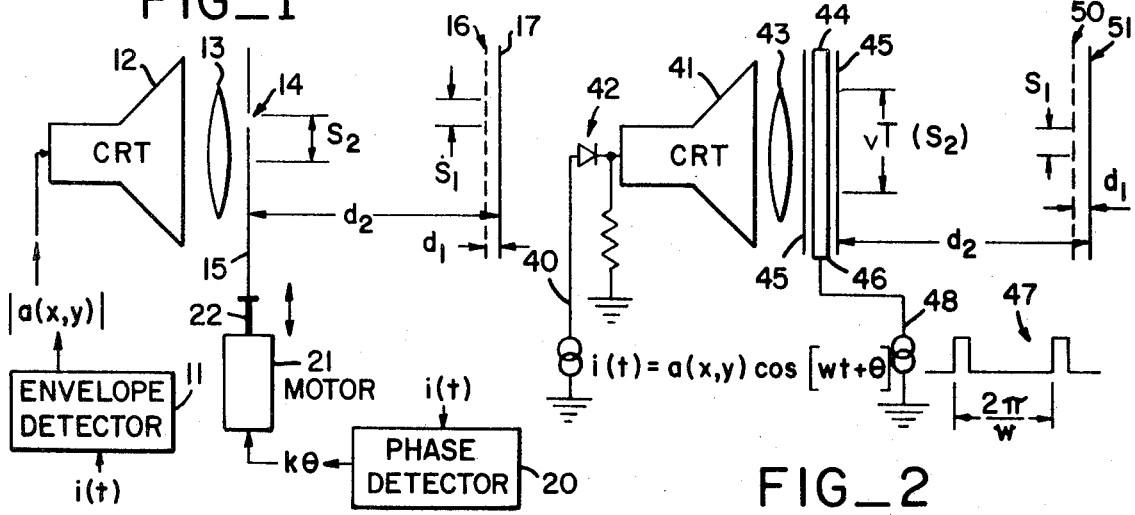
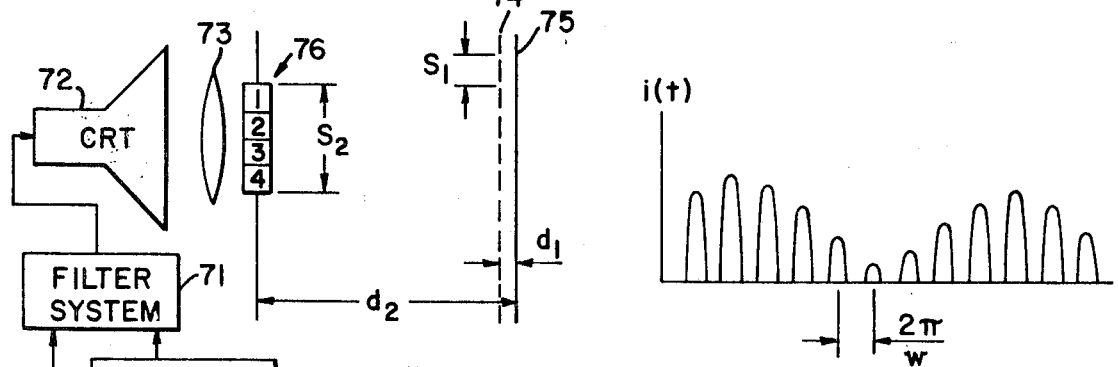
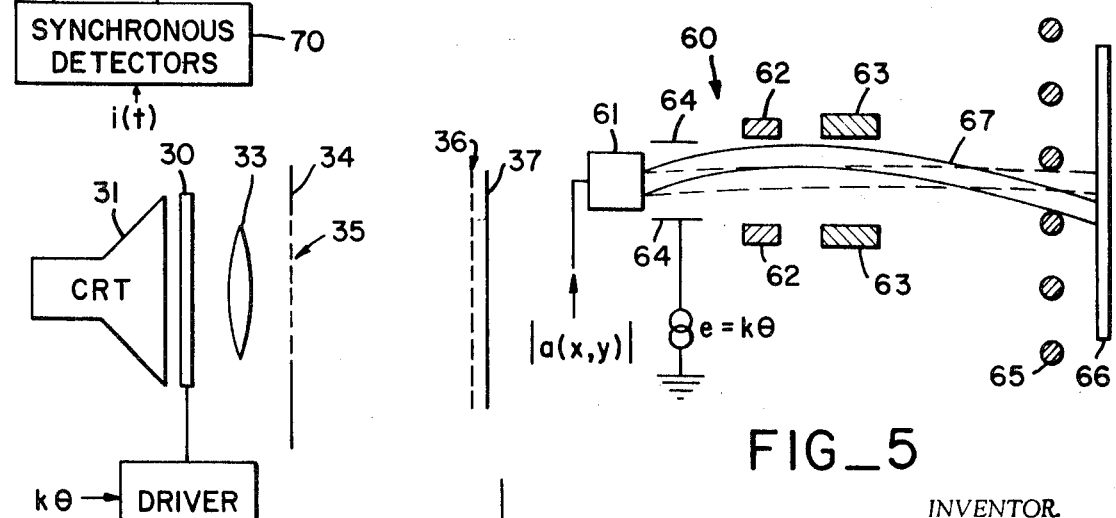
INVENTOR.
ALBERT MACOVSKI
BY
Townsend and Townsend
ATTORNEYS

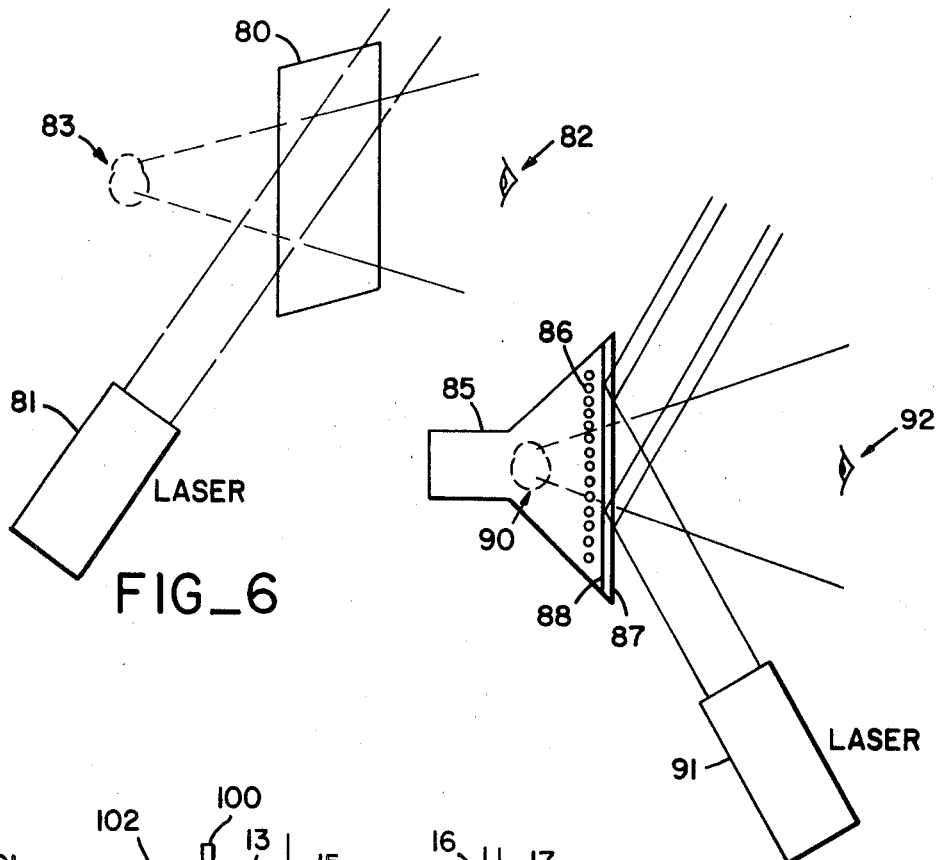
FIG_6
FIG_7
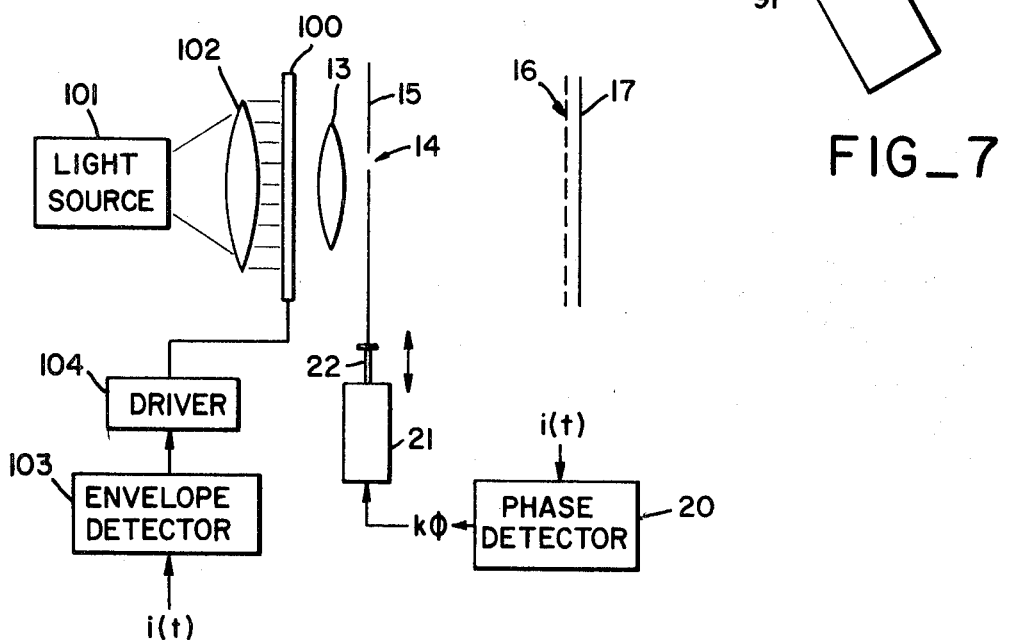
FIG_8
INVENTOR.
ALBERT MACOVSKI
BY
Townsend and Townsend
ATTORNEYS

HOLOGRAM REPRODUCTION SYSTEM USING AN OPTICAL GRATING

This invention relates to a new and improved hologram reproduction system for reconstructing a holographic image from information about the amplitude and phase of diffracted light rays obtained from a hologram or generated by a computer or data processing system.

In conventional holography, coherent light diffracted by an object or reflected from an object interferes with a reference beam of coherent light to produce a complex light interference pattern known as a hologram which can be recorded on photographic film. The hologram, although not visually recognizable as a reproduction of the object, contains all the optical information necessary for reconstructing or reconstituting an accurate three-dimensional image or representation of the original object. This can be accomplished by exciting the hologram with coherent light.

The hologram interference pattern contains information about the amplitude and phase of the diffracted light rays, superimposed on a spatial frequency carrier whose spatial frequency is a function of the angle between the axes of the diffracted object beam and the reference beam of coherent light. Thus, the intensity signal, $i(x,y)$ across the diffraction pattern is a function of the following general form where K is a constant, $a(x,y)$ is the amplitude component containing amplitude information about the diffracted light, $\theta(x,y)$ is the phase component containing phase information about the object and reference light, and $w$ is the spatial frequency of the carrier:

$$i(x,y)=K+a(x,y)\cos[wx+\theta(x,y)] \quad (1)$$

Conventional holography has the disadvantage that the amplitude and phase information is generally superimposed on a high spatial frequency carrier so that special high-resolution films must be used to record the hologram pattern. Such high-resolution films are insensitive and require long expose times.

The spatial frequency carrier for the amplitude and phase information can be reduced by reducing the angle between the diffracted object light beam and the reference light beam to small angles approaching zero. This system of holography, however, known as the Gabor "on-axis" system, has the disadvantage that at low spatial frequencies, separation of the amplitude and phase information about the diffracted object and reference light beams from undesirable optical information is poor. Furthermore, when the hologram is reproduced on a cathode-ray tube, the resolution of the cathode-ray tube limits the frequency of the spatial carrier.

In U.S. Pat. application Ser. No. 781,842 filed on Dec. 6, 1968, entitled "Scanned Holography Systems Using Temporal Modulation," the present inventor sets forth an efficient holography system for superimposing holographic amplitude and phase information on a temporal frequency carrier of the following general form in which the symbols correspond to equation (1) except that the frequency $w_1$ is a temporal frequency.

$$i(t)=K+a(x,y)\cos[w_1t+\theta(x,y)] \quad (2)$$

Briefly, according to the disclosure in that patent application, an interference pattern is established between light scattered from an object and a reference light beam. One of the beams, however, is phase modulated to cyclically offset in time, by displacing in phase, the relationship between the reference and object beams. The image information is thereby superimposed on a temporal frequency carrier. The resulting interference pattern is scanned to generate electrical signals modulated on a carrier, including the desired and undesired light information which may thereafter be separated by electronic filtering, As a result, an on-axis system can be utilized while still permitting separation of the desired amplitude and phase information from undesired information. For hologram reproduction on a cathode-ray tube, however, this system makes inefficient use of the CRT because the low-frequency carrier limits the resolution obtainable by the CRT.

It is, therefore, an object of the present invention to provide a new and improved holographic image reconstruction system which permits separation of optical image data from undiffracted optical components by the use of a high-frequency spatial carrier.

Another object of the invention is to provide a holographic reproduction system particularly suitable for reproduction by a cathode-ray tube and which takes optimum advantage of the resolution capabilities of the cathode-ray tube.

A further object of the invention is to provide a holographic image reconstruction system in which amplitude and phase information are resolved and reconstructed separately. The amplitude component alone can then be reproduced on a cathode-ray tube or other electronically addressable optical display so that the spatial frequency carrier does not have to —be resolved by the optical display.

In order to accomplish these results, the present invention generally contemplates a holographic image reconstruction system in which holographic light amplitude and phase information in electrical analog signal form are separately detected for use in reconstructing a hologram from the amplitude and phase data. An electrical signal containing the desired holographic light amplitude and phase information in analog form can be generated for example by an image dissector which temporally scans a generated hologram interference pattern in the manner set forth in patent application Ser. No. 781,842 referred to above. Electrical analog signals containing holographic light amplitude and phase information can also be generated by computer and data processing equipment as is well known in the art.

According to the invention, the amplitude is envelope detected and the absolute value of the amplitude signal applied to a cathode-ray tube or other electronically addressable optical display. The cathode-ray tube or other display constitutes an incoherent light system in which the amplitude component alone is reproduced. A feature and advantage of the invention is that the cathode-ray tube or other display does not have to resolve the spatial frequency carrier upon which the amplitude and phase data are ultimately superimposed. It only has to resolve the relatively low-frequency signals representing the amplitude components.

The invention also contemplates the provision of an external optical grating in the form of, for example, a binary line grating or a lenticular lens structure through which the amplitude image reproduced by the optical display is projected, for example, onto a film. Thus, the optical grating which supplies the necessary spatial frequency carrier can be positioned adjacent a film plane, and the amplitude pattern imaged through the external grating onto the film to form a transparency. Alternatively, it is a feature of the invention that the amplitude image can be projected through the grating onto a real time imaging system for application in three-dimensional television.

According to another aspect of the invention, the phase image data is also separately detected and the phase signal applied for varying the phase of the shadow image of the grating on the film or real time imaging system. For example, the image of the external grating on the film or imaging system can be phase modulated by modulating the aperture or angle of the lens which images the amplitude pattern through the grating. Thus, the phase signal can be used, for example, to drive a motor which appropriately positions or modulates the aperture, or to control light valves at the aperture. The result of the summation of amplitude and phase information is a reconstruction of the hologram on film or instantaneously on a real time imaging system from which a three-dimensional reproduction of the original object can be obtained by exciting the hologram with coherent light.

The invention contemplates introduction of the phase information into the reproduced amplitude image according to a variety of techniques.

In one form of the invention, the aperture of the image forming lens is modulated by a sonic delay line placed in the exit pupil of the lens with crossed polarizers on either side of the delay line. The sonic delay line consists of a layer of material such as fused quartz or water at one end of which a sonic pulse is generated in response to the phase component extracted from the electrical signal. As the sonic pulse travels along the material layer, the polarization changes in the region of the pulse as a result of stress birefringence thereby providing an effective transparent aperture which travels along the layer of the sonic delay line. The signal applied to the cathode-ray tube in that event is not the amplitude envelope but rather the half-wave rectified pulses representing the amplitude data and a fast response CRT or other optical display must be used. The pulses applied to the sonic delay line are synchronized with the rectified pulses representing amplitude data which are applied to the CRT or optical display. The pulses applied to the sonic slit generator are at a constant frequency, while the phase of the data pulses applied to the optical display vary. The phase information is, therefore, automatically superimposed on the amplitude pattern projected through the optical grating according to the angle determined by the location of the transparent slit along the sonic delay line relative to the amplitude pattern at a particular time. This change in angle changes the phase of the grating shadow on the sequential amplitude images.

In another form of the invention, the phase information and spatial frequency carrier are superimposed on the amplitude information supplied to a cathode-ray tube within the cathode-ray tube itself. According to this embodiment of the invention phase deflection plates, and magnetic focusing elements are provided within the cathode-ray tube in addition to scanning deflection elements, for controlling the electron beam. The phase signal is applied to the phase deflection plates at the same time that the amplitude signal is applied to the electron beam generator of the cathode-ray tube so that both the amplitude and phase information are superimposed on the electron beam. A wire grid is placed close to the phosphor screen for superimposing a spatial frequency carrier on the electron pattern impinging on the phosphor screen and the phase of the superimposed spatial carrier is carried by the phase signal applied to the phase deflection plates. A feature and advantage of this embodiment of the invention is that the CRT does not have to resolve the spatial frequency carrier as it is superimposed by shadowing.

According to another embodiment of the invention, an image is reconstructed from a hologram intensity function in electrical analog signal form by synchronously detecting and separating the real and imaginary parts of the intensity function. The real and imaginary parts consist of cosine and sine waveforms with both positive and negative values. Each of the real and imaginary parts is therefore separated, as, for example, by clipping, into positive and negative components and the absolute value of each of the components is formed. The four components are thereafter sequentially applied to a cathode-ray tube or other electronically addressable optical display to form sequential patterns corresponding to the component signals. Each of the four patterns is imaged through an optical grating as heretofore described so that the shadow image of the optical grating is superimposed on the pattern. The four superimposed patterns are summed, for example, on photographic film or a real time imaging system to form the final image. As each of the four patterns is imaged and superimposed on the optical grating, the position of the aperture or exit pupil of the lens imaging system is changed thereby to change the angle of projection according to the component being reproduced on the cathode-ray tube. Alternatively, the position of the grating is varied to thereby vary the phase of the grating image in accordance with the particular component pattern reproduced by the cathode-ray tube.

The invention also contemplates real time reproduction of a three-dimensional image from the reconstructed hologram for application in, for example, three-dimensional television. In this respect, the invention contemplates imaging the amplitude and phase information on a controlled transparency screen such as an Eidophor, a scanned electro-optic crystal, or a photochromic plate. The changing real time holographic sequence on the controlled transparency screen is excited with coherent light for continuous observation of a three-dimensional representation of the original object.

In the Drawings:

FIG. 1 is a diagrammatic view of an optical train for constructing an image from holograph light amplitude and phase information according to the present invention.

FIG. 2 is a diagrammatic view of another hologram reproduction system for reconstructing an image from the rectified hologram intensity function.

FIG. 2a is a graph showing the amplitude signal applied to the grid of the cathode-ray tube in FIG. 2.

FIG. 3 is a diagrammatic view of a hologram reproduction system for constructing an image from the real and imaginary components of a hologram intensity function.

FIG. 4 is a diagrammatic view of another hologram reproduction system for constructing an image from holographic light amplitude and phase information.

FIG. 5 is a fragmentary, diagrammatic cross-sectional view of a cathode-ray tube modified for constructing an image from holographic light amplitude and phase information according to the present invention.

FIG. 6 is a diagrammatic perspective view of a conventional arrangement for producing a three-dimensional image from a hologram transparency.

FIG. 7 is a diagrammatic view of an arrangement for real time reconstruction and display of three-dimensional holography.

FIG. 8 is a diagrammatic view of a system for holographic reconstruction utilizing a generalized scanned optical display in lieu of a cathode-ray tube.

FIG. 1 is a diagrammatic view of a generalized system for reproducing holographic image data in electrical analog signal form according to the present invention. As shown in that figure, an electrical analog signal representing a holograph intensity function $i(t)$ is applied to envelope detector 11. The intensity function $i(t)$ is of the form set forth in equations 1 or 2 above and the output of envelope detector 11 corresponds to the absolute value of the amplitude component $a(x,y)$. This magnitude signal derived by envelope detecting the intensity function is used to modulate the intensity of the electron beam generated by cathode-ray tube 12 to thereby form on the face of the tube an amplitude pattern representative of the amplitude information about the image being reconstructed. The amplitude pattern formed on the face of the cathode-ray tube 12 is imaged by lens system 13 through an aperture 14 formed in mask 15. The image so formed is projected through a line optical grating 16 onto a film plane 17 positioned adjacent but spaced from the optical grating 16. The image formed on film plane 17 is therefore the amplitude pattern formed by the cathode-ray tube with the shadow image of line optical grating 16 superimposed on the amplitude pattern. The optical grating thereby provides the necessary "spatial frequency carrier."

At the same time, the intensity function signal $i(t)$ is phase detected by phase detector 20 consisting of a synchronous detector such as a product detector or mixer and filters for extracting the phase component. The phase signal is used to drive the precision motor 21 which operates a reciprocating element 22 connected to the mask 15, in response to the phase signal. The motor 21 is constructed so that the extent of displacement of the mask 15 and aperture 14 by reciprocating element 22 is proportional to the phase signal. As a result of the displacement of the mask 15 the aperture 14 changes position in response to the phase signal changing the phase of the shadow image of optical grating 16 superimposed on film pattern 17. Alternatively, the motor 21 could drive the optical grating 16. As a result, phase information about the image being reconstructed is introduced by varying the phase of the "spatial frequency carrier" superimposed on the amplitude pattern generated by cathode-ray tube 12.

A further understanding of image reconstruction from holographic image data according to the present invention is obtained by referring to the following generalized intensity function $f(t)$ for a hologram interference pattern in which $R$ is the amplitude of the reference light, $U$ the amplitude of the object light, and $w$ the frequency of either a temporal or spatial frequency carrier, the following equation showing a temporal frequency carrier:

$$f(t) = R^2 + U^2 + U^*R^{iwt} + R^*U^{-iwt} \quad (3)$$

The $R^2$ term represents the intensity of undesirable background reference light while the $U^2$ term represents the intensity of undesired objected light. The cross terms, however, represent the desired interference fringes produced by interference of the object and reference light and containing the desired conjugate image information ($R^*U$ representing the real image term and $U^*R$ representing the virtual image term). In U.S. patent application Ser. No. 781,842, entitled "Scanned Holography Systems Using Temporal Modulation," referred to above, the conjugate image terms are modulated or offset on a temporal frequency carrier or frequency $w$ and the entire hologram intensity function is represented in electrical analog signal form by scanning the hologram with a scanned hologram recorder. The desired components of the signal can then be separated from the undesired components by appropriate electrical filtering. After filtering, the $R^2$ and $U^2$ terms are eliminated leaving the filtered signal $f_1(t)$ containing the conjugate image information which in turn contains both the amplitude and phase information necessary for reconstructing an image of the original object.

The magnitude of the filtered signal mag $f_1(t)$ which represents the absolute value of the amplitude information contained in the signal is derived by envelope detecting the filtered intensity function to give the following signal wherein $Re$ represents the real portion or cosine portion of the generalized intensity function and wherein $Im$ represents the imaginary or sine component of the generalized intensity function:

$$\text{mag } f(t) = \sqrt{[\text{Re } f_1(t)]^2 + [\text{Im } f_1(t)]^2}$$

$$= \text{Envelope } [U^*Re^{iwt} + R^*U^{iwt}] \quad (4)$$

The filtered signal $f_1(t)$ can thus be represented by separable amplitude and phase components:

$$f_1(t) = |f_1(t)| e^{i(wt+\theta)} \quad (5)$$

The phase information signal is derived by synchronously detecting the intensity function $f(t)$ using the sine and cosine signals, sine $wt$ and cos $wt$, of the intensity function and deriving the arctangent of their ratio as set forth in the following equations:

$$\theta = \tan^{-1} \frac{\text{Im } f_1(t)}{\text{Re } f_1(t)} = \tan^{-1} \frac{i[U^*R - R^*U]}{U^*R + R^*U}$$

$$= \tan^{-1} \frac{f_1(t) \sin wt}{f_1(t) \cos wt} \quad (6)$$

Such synchronous detection is accomplished utilizing a product detector or mixer with appropriate filtering. The 180° ambiguity of the arctangent function can be resolved by using the polarity of the imaginary part, $f(t) \sin wt$, which is positive for the phases 0° to 180° and negative for phases 180° to 360°. Thus, a nonlinear transfer function approximating the arctangent can be used to find the desired phase.

Preferably, the phase signal $\theta$ can be derived by comparing a reference phase at the frequency $w$ with the varying signal $\cos(wt+\theta 360°)$. This can be done with appropriate shaping networks by deriving a pulse waveform from one of the signals, for example, the reference signal, and by deriving a sawtooth waveform from the other signal, namely, the signal of variable phase, $\cos(wt+\theta)$. The pulse is then used to sample the sawtooth amplitude. The amplitude of the sawtooth wave at the sample time is linearly proportional to the phase difference. Thus, the sampled output will be a voltage equal to $k\theta$, where $k$ is a constant.

The magnitude signal, derived from the envelope detector, is applied to a cathode-ray tube. The phase information is applied to continuously vary the position of the aperture of the imaging system which images the amplitude pattern through the optical grating onto an adjacent film plane in accordance with the output of the phase signal. As shown in FIG. 1, a precision motor is used to vary the position of aperture 14. Alternatively, the aperture can be quantized into an array of small elongated light modulators or light valves which are individually opened and controlled by the phase signal to change the angle of projection of the image formed by cathode-ray tube 12.

The geometrical requirements for the arrangement of the elements in FIG. 1 according to ray tracing techniques are set forth in the following Equation (7). D1 is the distance between the plane of the aperture or exit pupil 14 and the film or image plane 17, while D2 is the distance between the line optical grating 16 and the film or image plane 17. S1 is the distance between lines on the optical grating 16 while S2 is the slit translation along the plane 15 necessary to obtain a phase displacement of 360 degrees or one wavelength for the shadow image of grating 16 on plane 17.

$$S2 \, D1 = S1 D2 \quad (7)$$

The aperture of the imaging system can also be modulated by using continuously varying optical systems.

Such a system for continuously varying the aperture of the imaging system is illustrated in FIG. 4. As shown therein, a plate 30 comprising an electro-optic valve for selectively polarizing light is positioned adjacent the face of cathode-ray tube 31. Light from the amplitude pattern formed on the cathode-ray tube 31 is selectively polarized by polarizing valve 30 according to the phase signal applied to the electro-optic valve driver 32. The polarized light is imaged by lens system 33 through a linear polarizer such as Polaroid film comprising lines of continuously varying polarization. Thus, linear absorber 34 comprises a row of lines 35, each line having a slightly different direction of polarization to provide continuously varying polarization in a direction perpendicular to the lines so that the effective line aperture or exit pupil for light imaged by lens 33 varies in response to the phase signal applied to electro-optic polarizing plate 30. The image is thereafter projected through the line optical grating 36 onto adjacent film plate 37 as heretofore described.

Alternatively, the mask 34 could comprise a sheet of lines of continuously varying color in a direction perpendicular to the lines, with plate 30 comprising a chromatic birefringent cell for varying the color transmission in accordance with the phase signal applied to driver 32. The effective position of the line aperture or exit pupil for lens 33 would thereby be continuously varied in response to the phase signal applied to driver 32.

Another system for introducing phase information into the reconstructed image is shown in FIG. 2. According to that embodiment, the holograph intensity function in the form of an electrical analog signal is applied to the input line 40 to the electron beam generator of cathode-ray tube 41. Interposed in line 40 is a diode 42 for rectifying the input signal so that the signal input to the electron gun of cathode-ray tube 41 is in the form of rectified pulses modulated by the amplitude envelope as illustrated in the graph of FIG. 2a. Thus, the signal consists of a sequence of pulses having an average period $2\pi/w$, where $w$ is the frequency of the holographic image information carrier. The amplitude of the pulses is, of course, modulated according to the image amplitude information, while the phase of the pulses varies according to the corresponding image phase information. The resulting patterns formed by the application of the signal shown in FIG. 2a to the electron gun of cathode-ray tube 41 are imaged by lens system 43 through a sonic delay line 44 interposed between a pair of crossed polarizers 45. The sonic delay line 44 and crossed polarizers 45 function together to form a dynamic aperture or exit pupil for the lens system 43. Sonic delay line 44 consists of a layer of material such as fused quartz or water along one end of which sonic pulses are generated by an elongated transducer 46 in response to the square wave pulses of a pulse signal having a constant phase and a constant period between the pulses of $2\pi/w$, The pulse signal, represented at 47 in FIG. 2, is applied at line 48. As the generated sonic pulse travels along the material layer 44, the polarization changes in the region of the pulse as the result of stress birefringence, thereby providing an effective transparent slit or line aperture which travels along the layer of the sonic delay line permitting light to pass through the crossed polarizers. The pulses applied to the cathode-ray tube are of variable phase so that the patterns produced by the cathode-ray tube are imaged by lens system 43 through transparent slits or line apertures formed by the functional combination of the sonic delay line in different positions according to the variation in phase of the pulses applied to the electron beam generator of cathode-ray tube 41. The images of the amplitude patterns formed by lens system 43 are projected through the line optical grating 50 onto an adjacent film plane 51 as heretofore described. Thus, the pulses applied to the sonic delay line are synchronized with the frequency of the carrier of the holographic image data but the pulses applied to the sonic slit generator are at constant frequency and phase, while the phase of the data pulses applied to the cathode-ray tube vary. The phase information is therefore automatically superimposed on the amplitude pattern projected through the optical grating because of the change in angle depending upon the location of the transparent slit along the sonic delay line 44 with reference to the pattern being formed on cathode-ray tube 41.

The geometry of the elements of the system is arranged so that the distance D2 between the film plane 51 and the plane of the effective exit pupil of lens system 43, the distance of travel of the generated slit during one pulse period equal to $vT$ where $v$ is the velocity of propagation of the acoustic pulse in the sonic slit generator and T is the period between pulses, the distance D1 being the film plane 51 and line optical grating 50 are all related according to the following equation:

$$S1 D2 = vt\ D1 \tag{8}$$

In the embodiment of the present invention shown in FIG. 5, signals representative of the amplitude and phase extracted from the holograph image intensity function are applied separately for reconstruction of an image within the cathode-ray tube itself. As shown in that figure, the signal obtained by envelope detecting the holograph intensity function signal and representing the amplitude image information is applied to the electron gun 61 of cathode-ray tube 60 for modulating the intensity of the generated electron beam. The cathode-ray tube is constructed so that in addition to the normal scanning deflection yoke 63, there are also provided magnetic focusing elements 62 and phase deflection plates 64. A phase signal, obtained by synchronously detecting the holographic image intensity function signal as heretofore described is applied to the phase deflection plate 64 at the same time that the amplitude signal is applied to the electron gun 61. A wire grid 65 is placed close to but spaced from the phosphor screen 66, or screen of controlled transparency material, so that the structure of the grating 65 is superimposed by shadowing onto the pattern formed by the scanning electron beam. The grating 65 is positioned substantially normal to the direction of the scan lines of electron beam 67 in order to avoid moire patterns. The phase deflection plates 64 and magnetic focusing system 62 function together to vary the phase of the shadow image of grating 65 on the pattern formed by the electron beam. While the electron beam 67 is intensity modulated with the envelope information superimposing an amplitude pattern on the scanning electron beam the phase information signal is applied to the auxiliary phase deflection plate 64. These plates along with the magnetic lens system 62 determine the angle at which the beam strikes the wire grid and thus the phase of the shadowed image of the grating on the amplitude pattern formed on phosphor screen 66. A feature and advantage of this system is that the electron beam does not resolve the grating structure because the grating structure is superimposed on the amplitude pattern by shadowing of the electron beam. Thus, the beam can be much larger than the period of the grating.

Another approach to reconstructing an image from a holograph image intensity function is shown in the system of FIG. 3. According to this aspect of the invention a holograph image intensity function $f_1(t)$ of the form, $$f_1(t) = U^* Re^{iwt} + R^* Ue^{-iwt} \tag{9}$$

obtained by filtering as heretofore described is separated into real and imaginary components using synchronous detector. One synchronous detector extracts the cosine or real component of the intensity function as follows:

$$\text{Re} f_1(t) = \cos wt\ [U^* Re^{iwt} + R^* U^{-iwt}] = U^* R + R^* U + (\text{high-frequency components which are filtered out}) \tag{10}$$

second harmonic terms and higher order terms being excluded from the result by appropriate filtering. The second synchronous detector extracts the sine or imaginary component of the intensity function as follows, $$\text{IM} f_1(t) = \sin wt [U^* Re^{iwt} + R^* Ue^{-iwt}] = i[U^* R - R^* U] + (\text{high-frequency components which re filtered out}) \tag{11}$$

second harmonic terms and higher order terms being excluded from the final results by appropriate filtering. Thus, according to a generalized form of this embodiment of the invention the holographic image intensity function is applied to a pair of synchronous detectors 70, the output of which passes through a filter system 71 including low-pass filters, and the results are applied sequentially to the electron gun of cathode-ray tube 72 for modulating the intensity of the electron beam. The patterns produced by the cathode-ray tube 72 are imaged by lens system 73 through line optical grating 74 having a spatial frequency $w_o$ positioned immediately adjacent the film plane 75. First, with the grating in a fixed initial position the real component signal is applied to the cathode-ray tube and is scanned utilizing a $\cos wt$ function. The grating 74 is then moved horizontally a distance of one-quarter of a wavelength, namely, $\lambda/4$ and the imaginary component signal is applied to the cathode tube and scanned utilizing a $\sin wt$ function. The resultant image intensity function superimposed on film plane 75 is given by the following equations:

$$I = [U^* R + R^* U] \cos w_o x + i[U^* R - R^* U] \sin w_o x$$
$$= U^* Re^{iw_o x} + R^* Ue^{-iw_o x} \tag{12}$$

Thus, the terms have been separated on a spatial frequency carrier of frequency $w_o$, which the cathode-ray tube did not have to resolve. The cathode-ray tube only had to resolve the low-frequency signals representing the real and imaginary parts or components of the image intensity function.

A disadvantage of this generalized system described above is that the real and imaginary components of the image intensity function are AC waveforms with both positive and negative values. To insure that the entire signal modulates the cathode-ray tube a bias term must be added to both the real and imaginary parts. This causes a spot to appear in the center of the reconstructed image since a fixed carrier will be generated. This bias problem can be overcome if the absolute value of the real and imaginary parts are applied to the cathode-ray tube. The polarity of the grating must then be reversed each time the polarity of the real or imaginary part reverses.

A system for separately imaging both the positive and negative parts of the real and imaginary components of a holographic image intensity function is further shown with reference to FIG. 3. In the aperture or exit pupil of lens system 73 is placed a series of elongated light valves 76 in number equal to the four separate parts of the image intensity function being reproduced. With only one of the light valves 1 through 4 open, a relatively high F number or narrow angle optical system is provided. With the narrow slits provided by the four light valves, the grating 74 is shadowed onto the film plane 75 in different positions depending upon which of the light valve slits is open. Thus, the positions of the open slit formed by the respective light valves determines the phase of the grating shadow image on photograph film 5. In this method, the conventional line optical grating 74 is placed very close to but not against the film plane 75. In utilizing the system, slits 1 and 3 can be used, for example, in imaging, respectively, the positive and negative polarities of the cos $wx$ component, while the slits provided by light valves 2 and 4 can be used, respectively, for the positive and negative polarities of the sin $wx$ component. Negative components of the sin and cos signals obtained from synchronous detectors 70 are first passed through polarity reversal components 78 for application to the cathode-ray tube.

In order to obtain proper phase relationship between the shadow image of grating 74 and the four patterns produced by cathode-ray tube 72 and imaged onto film plane 75 by means of the lens system 73 and light valves 76, the geometry of the system must be arranged accordingly. Where D2 is the distance from the exit pupil formed by light valves 1 through 4 and film plane 75, D1 is the distance between optical grating 74 and film plane 75, S1 is the distance between lines on the line optical grating 74 and S2 is the distance over which the exit pupil slit position changes a distance of one wavelength or 360° phase shift, then, the geometry of the elements must be arranged so that:

$$S2D1 = S1D2$$

The grating structure 74 near the film plane 75 can alternatively be either a density grating or binary grating or a lenticular lens structure. The latter has greater optical efficiency and provides greater depth of modulation of the resultant superimposed grating because of the focusing action of the lenticular lens structure. It does, however, have a slight defocusing action on the cathode-ray tube image itself.

In operating the system of FIG. 3, the absolute value of one of the components, for example, the real component, of the image intensity function is applied to the cathode-ray tube. A clipped "polarity" signal is derived from polarity signal generator using the polarity of the part of the real component being applied to the cathode-ray tube and this clipped polarity signal is utilized for turning on either light valve 1 or 3, depending upon the polarity of the part of the real component being applied. A pattern is thereby formed on the cathode-ray tube screen by the scanning action of the electron beam. In the second scan, the absolute value of the imaginary component of the image intensity function is applied to the cathode-ray tube with a clipped polarity signal turning on either light valve 2 or 4, depending on the polarity of the part of the imaginary component being applied to the cathode-ray tube. Thus, one of the light valves 1 or 3 is open during scanning of the positive part of the real component while the other light valve is open during scanning of the negative part of the real component. Similarly, one of the light valves 2 or 4 is open during scanning of the positive part of the imaginary component of the image intensity function, while the other light valve is open during scanning of the negative part of the imaginary component of the image intensity function. Each light valve provides an effective phase shift of the grating shadow of $\lambda/4$ or 90° so that the positive and negative parts of the sin and cos components are superimposed in the proper phase relationship. The respective scan for the real and imaginary components can be formatted either as complete alternate frame scans or can be formatted on a line-by-line basis with a line advance occurring only after line scans for both the real and imaginary components have taken place.

Thus, according to the system set forth above, the cathode-ray tube only has to resolve the low-frequency signals representing the real and imaginary parts and does not have to resolve the spatial frequency carrier superimposed on the reconstructed amplitude information by shadowing on film plane 75.

In each of the foregoing examples, the amplitude pattern imaged through the phase grating can be projected on a film plane for summing and storing the holographic information on a film transparency. As shown in FIG. 6, a three-dimensional image of the original object is obtained from such a transparency 80 by passing a beam of coherent light generated by laser 81 through the hologram transparency at an angle with respect to the perpendicular axis of the transparency. At the same time, the transparency is viewed from observation point 82 substantially along the optical axis of transparency 80 for viewing the three-dimensional virtual image 83 of the original object.

Rather than permanent storage of the reconstructed hologram on a film transparency, the hologram can be imaged on a screen of material of controllable transparency such as an Eidophor, a scanned electro-optic crystal plate, or a photochromic plate. Controllable transparency screens of this type are well known in the art as set forth in the following references which describe, respectively, the use of Eidophor, electro-optic and photochromic screens:

1. E. I. Sponable, "Eidophor system of theater Television," *J. Soc. Motion Pict. and Telev. Engrs.*, Vol. 60, No. 4, pp. 337–343 (Apr. 1953).
2. E. Lindberg, "Solid Crystal Modulates Light Beam," *Electronics* (Dec. 20, 1963).
3. L. B. Heilprin, "Communication Engineering Approach to Microforms," *American Documentation*, Vol. 12, No. 3 (July 1961), p. 213.

As shown in FIG. 7, cathode-ray tube 85 is similar to that shown in FIG. 5 and is provided with internal grating 86 as heretofore described. Instead of a phosphor screen, however, the CRT is provided with a screen 87 of material of controllable transparency of the type set forth above, for example, a scanned electro-optic ceramic plate. Intermediate screen 87 and grating 86 is provided an evaporated aluminum film 88. Film 88 is transparent to the electron beam from the cathode-ray tube 85 but reflects light. The aluminum film 88 can be formed along the inner surface of screen 87. A three-dimensional virtual image 90 can be obtained from the real time holography generated on screen 87 by coherent light from laser 91. Laser light beam is incident on screen 87 at an angle and the light passes through the screen material to aluminum film 88 from which it is reflected back through the screen material. According to the hologram transparency pattern generated on the screen the coherent light is diffracted and interfered to reproduce a three-dimensional virtual image viewable from a station such as 92. A variety of real time display systems can be constructed according to the above principles. Thus, the film plane in FIG. 1 can be substituted with a screen of controlled transparency for imaging the hologram in real time. The sequential holography reproduced on the screen can be continuously interrogated with coherent light either reflectively or transmissively for continuously reconstructing a three-dimensional image of the original object.

The various embodiments of the invention set forth in the foregoing examples have suggested the use of CRT's for the amplitude pattern imaging. Other electronically addressable optical displays can be used, however. As shown in FIG. 8, instead of a cathode-ray tube, there is provided a plate 100 of material comprising, for example, an electro-optic modulator. As shown in this example, light from scanned light source 101 is collimated by lens 102 and is normally incident on the plate 100. The relative transparency of plate 100 to the light 102 is controlled by the amplitude component of the electrical analog signal corresponding to the image intensity function. This amplitude component is derived from envelope detector 103 as heretofore described and is applied to the modulator driver 104 which controls the transmission of light through plate 100. The frequency of the amplitude component is relatively low. The light plate 100 responds to the amplitude signal only and does not have to resolve a high-frequency spatial carrier or other high frequency components. The amplitude image generated by plate 100 is processed in the manner heretofore described with reference, for example, to FIG. 1. Instead of an electro-optic modulating plate, the plate can be, for example, an electroluminescent panel which generates its own scanned light intensity in response to the applied signal.

What is claimed is:

1. In a hologram reproduction system wherein an electrical signal is generated having signal components corresponding to holographic light amplitude and phase information, the improvement comprising:

means for detecting and separating said amplitude signal and phase signal components;

means generating an amplitude pattern from said amplitude signal components;

means for superimposing said amplitude pattern on a spatial frequency carrier;

and means for modulating the phase of said spatial frequency carrier in response to said phase component signal.

2. A method for constructing a hologram from holographic light amplitude and phase information in electrical analog signal form comprising:

detecting and separating the amplitude and phase components from said signal;

generating an amplitude pattern from said amplitude component;

superimposing said amplitude pattern on a spatial frequency carrier; and modulating the phase of said spatial frequency carrier in response to the phase component of said signal.

3. A method for reproducing a hologram from holographic light amplitude and phase information comprising:

generating an electrical analog signal containing said holographic light amplitude and phase information;

detecting the amplitude component of said electrical signal;

generating from said amplitude component an amplitude pattern comprising an image of the amplitude component of said function;

projecting said amplitude image through an optical grating thereby to superimpose a shadow image of the grating on said amplitude pattern; and detecting the phase component of said electrical signal and modulating the phase of the superimposed shadow image of said grating on said amplitude pattern in accordance with said phase component signal.

4. A method for constructing a hologram from holographic light amplitude and phase information modulated on an electrical signal carrier comprising:

separating the amplitude and phase information components;

applying the amplitude component signal to an electronically addressable optical display to generate an amplitude image;

projecting the amplitude image formed by said optical display through an optical grating thereby to superimpose the shadow image of said optical grating on said amplitude pattern;

and modulating the phase of the shadow image of said optical grating superimposed on the amplitude pattern in accordance with said phase component signal.

5. A holographic image reproduction system for constructing a hologram for holographic light amplitude and phase information in electrical analog signal form comprising;

means for envelope detecting the electrical analog signal to provide a signal corresponding to the holographic light amplitude information;

electrically addressable optical display means for generating from the holographic light amplitude signal, an amplitude image;

an optical grating spaced from said optical display means;

a lens system for imaging the amplitude pattern generated by said optical display through the optical grating;

means for detecting the phase information from said holographic electrical signal to thereby generate a signal corresponding to said holographic phase information;

and means for modulating the phase of the shadow image formed by said optical grating in response to said electrical phase signal.

6. A holographic image reproduction system as set forth in claim 5 wherein said means for modulating the phase of the shadow image formed by said optical grating comprises:

means for modulating the effective position of the aperture of the amplitude pattern imaging lens system.

7. A holographic image reproduction system as set forth in claim 6 wherein said means for modulating the effective position of the aperture comprises:

a sonic delay line interposed between crossed polarizers;

means for generating acoustic pulses in the sonic delay line;

and means for modulating the acoustic pulse generator according to said electrical phase signal.

8. A holographic image reproduction system as set forth in claim 7 wherein said means for modulating the phase of the shadow image formed by the said optical grating comprises:

means for modulating the effective position of said grating.

9. A method of reproducing a hologram from a hologram intensity function comprising:

separating said hologram intensity function into real and imaginary parts;

generating a two-dimensional pattern in response to each component;

superimposing said patterns on a spatial frequency carrier in phases spaced approximately 90° apart;

and summing said superimposed patterns to form an image.

10. A hologram reproduction system for constructing a hologram from a hologram intensity function in electrical analog signal form comprising:

synchronous detector means for separating said hologram intensity function into its real and imaginary parts comprising waveforms with positive and negative values;

means for separating each said real and imaginary part into positive and negative components;

means for forming the absolute value of each said component;

electrically addressable optical display means and means for sequentially applying said components to the optical display thereby to generate in sequence patterns corresponding to each said component;

means for superimposing said patterns on a spatial frequency carrier in phases spaced approximately 90° apart;

and means for adding said superimposed patterns to form a composite image.

11. A hologram reproduction system for constructing an image from a holographic intensity function comprising:

synchronous detector means for separating said hologram intensity function into real and imaginary components, each said component comprising a waveform having positive and negative portions;

means for separating each said component into positive and negative subcomponents thereby to generate four subcomponents, namely, real positive, real negative, imaginary positive and imaginary negative components;

means for sequentially applying said four subcomponents to an electronically addressable optical display thereby sequentially to form four patterns corresponding to said four subcomponents;

an optical grating spaced from said optical display;

means for imaging the sequential patterns formed by said optical display through said optical grating to thereby superimpose the shadow image of said optical grating on each said pattern;

and means for spacing the phase of said shadow images superimposed on said patterns in approximately 90° increments of the spatial frequency of said optical grating.

12. A hologram reproduction system as set forth in claim 11 wherein said means for spacing the phase of said shadow images comprises means for changing the position of the effective aperture of said imaging means.

13. A hologram reproduction system as set forth in claim 11 wherein said means for spacing the phase of said shadow images comprises means for changing the position of the grating.

14. A hologram reproduction system as set forth in claim 12 wherein said means for moving the effective position of the aperture of the imaging means according to the pattern being formed by said cathode-ray tube comprises a plurality of light valves in the exit pupil of said imaging means.

15. A hologram reproduction system as set forth in claim 12 wherein said means for moving the effective position of the aperture comprises an electro-optic polarizing plate intermediate the electronically addressable optical display and said imaging means and a linear polarizer having bands of varying polarization on the other side of the imaging means.

16. A hologram image reproduction system wherein an electrical signal is generated having signal components corresponding to holographic light amplitude and phase information, the improvement comprising:

a cathode-ray tube having an electron beam generator, electron beam deflection plates, and a screen of phosphor or controllable transparency responsive to said electron beam, said cathode ray tube further provided with phase deflection electrodes and magnetic focusing means along the path of the electron beams generated by said cathode ray tube, and a grating means positioned inside cathode-ray tube spaced from but close to the screen of phosphor or controllable transparency whereby the amplitude component of said electrical signal can be applied to the electron beam generator and whereby the phase component of said electrical signal can be applied to the phase deflection electrodes to sum on the screen of phosphor or controllable transparency amplitude patterns on which are superimposed the shadow image of said grating means in variable phases according to the signal applied to said phase deflection electrodes.

17. A system for three-dimensional real time imaging from holographic light amplitude and phase information comprising:

means for generating an amplitude pattern from said amplitude information;
means for superimposing said amplitude pattern on a spatial frequency carrier;
means modulating the phase of said spatial frequency carrier in accordance with said phase information;
means for displaying said amplitude pattern and superimposed spatial frequency carrier of variable phase in real time;
and means for interrogating said display with coherent light.

18. A method for constructing a hologram from holographic light amplitude and phase information in electrical analog signal form comprising:

detecting and separating the amplitude and phase components from said signal;
generating an amplitude pattern from said amplitude component;
superimposing said amplitude pattern on a spatial frequency carrier;
modulating the phase of said spatial frequency carrier in response to the phase component of said signal;
displaying said amplitude pattern and superimposed spatial frequency carrier in real time;
and illuminating said display with coherent light.

19. A holographic image reproduction system for constructing a hologram from holographic light amplitude and phase information in electrical analog signal form comprising:

means for envelope detecting the electrical analog signal to provide a signal corresponding to the holographic light amplitude information;
electrically addressable optical display means for generating from the holographic light amplitude signal, an amplitude image;
an optical grating spaced from said optical display means;
a lens system for imaging the amplitude pattern generated by said optical display through the optical grating;
means for detecting the phase information from said holographic electrical signal to thereby generate a signal corresponding to said holographic phase information;
means for modulating the phase of the shadow image formed by said optical grating in response to said electrical phase signal;
a screen of controllable transparency for displaying in real time, said amplitude pattern and superimposed optical grating shadow image; and
a coherent light source for illuminating said screen with coherent light.

20. A method for constructing a hologram from holographic light amplitude and phase information modulated on an electrical signal carrier comprising:

separating the amplitude and phase information components;
applying the amplitude component signal to an electronically addressable optical display to generate an amplitude image;
projecting the amplitude image formed by said optical display through an optical grating on said amplitude pattern;
modulating the phase of the shadow image of said optical grating superimposed on the amplitude pattern in accordance with said phase component signal;
displaying the amplitude pattern and superimposed optical grating shadow image on a screen of controllable transparency;
illuminating said screen with coherent light.

21. A system for producing three-dimensional real time imaging comprising: a cathode-ray tube for reconstructing a hologram from holographic light amplitude and phase information components in electrical analog signal form comprising electron beam generator means for generating an electron beam having an intensity responsive to the amplitude component of said electrical signal, scanning deflection means for scanning said electron beam in a predetermined raster, a screen of controllable transparency responsive to said electron beam, phase deflection means for controlling the angle of said electron beam in accordance with the phase component of said electrical signal, and grating means positioned within said cathode-ray tube and spaced from but close to said screen of controllable transparency; and a coherent light source for interrogating said screen of controllable transparency with coherent light.

* * * * *